Patented Feb. 22, 1949

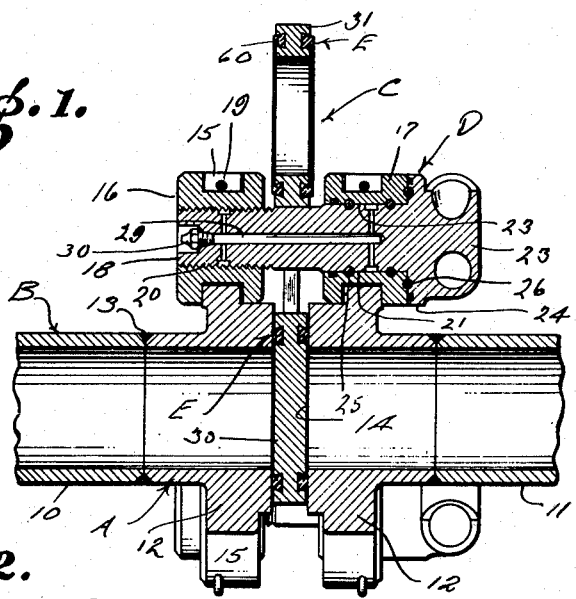

2,462,493

UNITED STATES PATENT OFFICE 2,462,493

SEAL FOR PIPE-LINE FITTINGS

Leland S. Hamer, Long Beach, Calif., assignor of one-fourth to Paul A. Dewhirst, Los Angeles, Calif.

Application July 19, 1944, Serial No. 545,602

3 Claims. (Cl. 138—44)

This invention has to do with a seal for pipe line fittings such as orifice fittings or line blinds and it is a general object of the present invention to provide a simple, practical and improved seal for acting between two elements of a fitting, for example, between a body part and a plate, either a blinding plate or orifice plate.

Pipe line fittings such as orifice fittings or line blinds or combinations of orifice fittings and line blinds require seals or a seal at the plate. The seal in such a device is annular in form and serves to prevent leakage from the fitting at the plate. The usual seal employed in devices of this kind is in the form of a gasket or is a packing ring of ordinary form, for instance, rectangular in cross section, set in a groove in one of the parts either in the plate or in the body of the fitting.

It is an object of this invention to provide an improved packing ring that seals against ordinary leakage without the application of great clamping pressure to the fitting. With the ordinary sealing means, that is, with the ordinary packing ring, or with a gasket, the seal is effected by the application of clamping pressure and if the fitting operates under any appreciable head it is usually necessary to apply great clamping pressure to the fitting before the seal becomes effective or tight.

The device of the present invention is such that a seal is made and is effective from the time the parts are brought together and leakage is checked long before final clamping pressure is applied.

It is a general object of the present invention to provide a packing of the type hereinabove referred to which is effective in making a seal upon the parts being brought together initially, and is also effective when the parts are tightened or clamped together with great force such as is ordinarily applied to fittings of the character under consideration.

Another object of my invention is to provide a seal of the character referred to which is extremely simple in form, easy to handle, and inexpensive of manufacture.

The various objects and features of my invention will be fully understood from the following detailed description of a typical preferred form and application of my invention, throughout which description reference is made to the accompanying drawings, in which:

Fig. 1 is a longitudinal detailed sectional view of a fitting involving the present invention showing it connected in a pipe line. Fig. 2 is a face view or side elevation of the plate section of the fitting showing it alone. Fig. 3 is a longitudinal sectional view of the plate section being a view taken as indicated by line 3—3 on Fig. 2, and Fig. 4 is an enlarged detailed sectional view showing the packing means provided.

The device or structure of the present invention is applicable, generally, to pipe line fittings, for instance, either to orifice fittings or to line blinds, and in accordance with the broader aspects of the invention the packing means proper provided by the invention can be carried either by a part of the body of the fitting or by the plate employed in the fitting. In the particular case illustrated I have shown a fitting which is a combination line blind and orifice fitting and I have shown, for example, the packing means carried by or confined to the plates, it being understood that my invention contemplates the reversal that I have just referred to.

The structure illustrated in the drawings involves, generally, a fitting A for use in a pipe line B, the fitting being shown connected between two sections 10 and 11 of the pipe line B. The fitting involves, generally, two body sections 12 joined to the ends of the pipe sections 10 and 11 in opposed relation, a plate unit C to act between the body sections, means D for clamping the body sections together with the plate section between them and sealing means E acting between the plate section and one or both of the body sections. In the case illustrated I have shown sealing means E carried by the plate section and have provided sealing means at both sides of the plate section so that a seal is made between the plate and both body sections.

The sections 12 of the body of the fitting form extensions or continuations of the pipe line parts 10 and 11 and in the case illustrated are shown welded to the pipe line parts at 13. The body sections have flat finished opposed inner end faces 14 between which the plate section of the fitting is arranged. In the particular fitting illustrated the body sections have circumferentially spaced projections 15 which project radially and carry the clamping means D. There may be various numbers of projections on the body sections, for instance, it is practical to provide three projections equally spaced on each body section and the body sections are applied to the pipe line so that the projections of the two body sections are opposite each other or in alignment with each other.

This particular clamping means involves, generally, a mechanism for joining body projections which are opposite each other. Each of these mechanisms includes a block 16 carried by the opposite body projection on the other body section, and a coupling member 18 joining the blocks. The blocks are spool-like parts seated in the projections 15 and retained in seated engagement with the projections by keys 19. Each block has one or more flat sides (not shown) engaging the body section to which it is applied so that it is held against turning.

The coupling member 18 has a threaded end 20 threaded into the block 16 and has a plain turned end 21 rotatably supported in an opening 22 provided through the block 17. A head 23 is provided on the member 18 adjacent the outer end of the block 17 to provide a part to be engaged by a tool. The head presents a shoulder portion 24 which fits against or opposes the block 17. In the preferred arrangement anti-friction members or bearings 25 are provided between the turned part 21 and the wall of the bore 22 and thrust bearing members 26 are provided between the outer end of the block 17 and the shoulder 24.

Ports 29 are provided in the member 18 so that lubricant can be introduced through a fitting 30 at one end of the member to reach the threads between the member and block 16 and the bearings between member 18 and the block 17.

With the construction just described as the member 18 is rotated the threads serve to either draw the blocks 16 and 17 together or urge them apart, depending upon the direction of rotation of the member 18. The blocks being secured to the projections on the body sections 12 carry the body sections with them and thus the body sections can be operated either toward each other or can be moved apart, as desired.

The plate member C of the fitting that I have illustrated involves a blind plate 30 at one end and an orifice plate 31 at the other end. The two plates are joined by spaced webs 32 which straddle one of the members 18 joining the body sections 12. The construction is such that when the body sections 12 are suitably separated the plate section can be manipulated to bring either the blind plate 30 or the orifice plate 31 into position between the opposing end faces 14 of the sections 12. In Fig. 1 I have shown the blind plate 30 in this position.

My present invention involves the sealing means E between a body section and a plate. In practice a unit of the present invention can be arranged between each side of the plate and each body section or a single unit of the invention can be employed at the side of the plate subject to pressure. I have shown four units of packing embodying the invention in that I have shown packing units at both sides of each of the plates of the plate section C. I will describe one of the packing units, it being understood that the description is equally applicable to all of them.

In accordance with my invention the packing is confined to or carried by one of the sections to be sealed and in the drawings is shown applied to the plate section to cooperate with the finished sealing face 14 of one of the body sections. The packing carrying section is provided with a groove 50 annular in form to surround the opening through the fitting or through the body section against which the packing is to operate. The groove 50 is preferably formed with undercut side walls 51 so that it effectively retains the packing ring that I am about to describe. In Fig. 4 of the drawings I have shown the undercut formation just referred to and have exaggerated the pitch of the side walls for purpose of illustration.

The packing unit involves an annular ring of packing, preferably a resilient ring formed of rubber or rubber-like material. If the fitting is to be employed to handle hydrocarbons, or the like, I employ a synthetic rubber of a type that will not be attacked by the material being handled.

The packing ring 60 involves, generally, a base portion 61 which extends into and is retained by the groove 50, a projecting portion 62, and a sealing lip 63. The base portion of the ring may be made to fit the shape of the groove 50 or to approximately fit the groove 50 so that it is firmly held therein when arranged as shown in Fig. 4.

The projecting portion 62 of the ring projects a suitable distance above or beyond the outer or sealing face 65 of the section in which the groove is formed and is preferably formed or finished with a smooth continuous sealing face 66 to oppose the finished face 14 of the other section. In practice I prefer to proportion the ring 60 so that the face 66 which is annular in form is fairly wide, as I have shown throughout the drawings.

In accordance with my invention I provide a V-shaped notch 70 in the corner of the ring 60 formed by the sealing face 66 and the innermost side 71 to form or establish the sealing lip 63. I shape and proportion the notch 70 so the sealing lip is tapered as clearly shown in Fig. 4. The outer end of the lip comes to an edge 75. The edge 75 of the lip being thin or pointed is flexible and will readily seal with the face 14 upon fluid pressure being exerted tending to leak out past the ring.

When the sealing unit that I have just described is used it becomes effective to stop ordinary leakage just as soon as the face 66 of the packing ring touches the face 14 of the opposing section for under that condition fluid tending to leak past the ring serves to seal the lip 63 and particularly the edge portion 75 of the lip 63 against the face 14. In order to positively insure against leakage and to seat the fitting permanently, the several units of the means D are operated so that the faces 14 and 65 are brought together or into close relationship, in which case the projecting portion 62 of the ring is compressed or deflected inward, with the result that the entire packing ring is put under compression with the result that it bears tightly against the face 14 and tightly in the groove 50, thus establishing and maintaining a highly efficient seal. Even under the condition of compression the lip 63 continues to function and thus supplements the sealing action gained by sheer compression. It will be noted from an examination of Fig. 4 of the drawings that the notch 70 is formed deep enough in the ring 60 to extend somewhat inward beyond the face 65 so that the lip 63 will at all times be such that pressure of fluid will be acting on it to urge it out against the face 14.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. In a pipe line fitting, two sections, one a body section with an opening therethrough and the other a plate section arranged at the opening, the sections having opposing faces, and sealing means around the opening including a packing ring carried in a groove in one face and having a projecting portion projecting beyond the grooved face, there being a V-shaped notch in the inner corner of the projecting portion forming a tapered lip facing the opening.

2. In a pipe line fitting, two sections, one a body section with an opening therethrough and the other a plate section arranged at the opening, the sections having opposing faces, and sealing means around the opening including a packing ring carried in a groove in one face and having a projecting portion projecting beyond the grooved face, there being a V-shaped notch in the inner corner of the projecting portion forming a tapered lip facing the opening, the notch extending inward beyond the grooved face.

3. In a fluid handling device, two sections arranged together and subjected to fluid under pressure and having flat opposed faces, one of the sections having an annular groove in one face opposing the other face, the groove having flat inwardly divergent side walls and a packing ring retained in the groove and having a notch in one outer corner facing inward and toward the other section forming a tapered sealing lip projecting from said face to engage the other section and seal therewith.

LELAND S. HAMER.

REFERENCES CITED

The following references are of record in the file of this patent:

UNITED STATES PATENTS

| Number | Name | Date |
| --- | --- | --- |
| 189,477 | Lightburne, Jr. | Apr. 10, 1877 |
| 494,402 | Walsh | Mar. 28, 1893 |
| 1,603,903 | Church | Oct. 19, 1926 |
| 1,869,577 | Oberhuber | Aug. 2, 1932 |
| 1,953,110 | Holtane | Apr. 3, 1934 |
| 1,965,826 | Daniel | July 10, 1934 |
| 2,014,682 | Greene | Sept. 17, 1935 |
| 2,081,040 | King | May 18, 1937 |
| 2,102,072 | Hinterliter | Dec. 14, 1937 |
| 2,278,849 | Hamer | Apr. 7, 1942 |

FOREIGN PATENTS

| Number | Country | Date |
| --- | --- | --- |
| 595,332 | France | Sept. 30, 1925 |